(12) United States Patent
Omelchenko et al.

(10) Patent No.: US 12,256,145 B2
(45) Date of Patent: Mar. 18, 2025

(54) ELECTRONIC DEVICE FOR AUTOFOCUSING AND METHOD OF OPERATING THE SAME

(71) Applicant: Samsung Electronics Co., Ltd., Suwon-si (KR)

(72) Inventors: Andrii Omelchenko, Kyiv (UA); Illia Krasnoshchok, Kyiv (UA); Kostyantyn Slyusarenko, Kyiv (UA); Vitalii Pohribnyi, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 18/070,934

(22) Filed: Nov. 29, 2022

(65) Prior Publication Data

US 2023/0171493 A1    Jun. 1, 2023

Related U.S. Application Data

(63) Continuation of application No. PCT/KR2022/018163, filed on Nov. 17, 2022.

(30) Foreign Application Priority Data

Nov. 29, 2021   (KR) .................. 10-2021-0167348

(51) Int. Cl.
*H04N 23/67* (2023.01)
*H04N 23/611* (2023.01)
*H04N 23/63* (2023.01)

(52) U.S. Cl.
CPC ......... *H04N 23/675* (2023.01); *H04N 23/611* (2023.01); *H04N 23/632* (2023.01); *H04N 23/671* (2023.01)

(58) Field of Classification Search
CPC .. H04N 23/675; H04N 23/611; H04N 23/632; H04N 23/671; H04N 23/635
See application file for complete search history.

(56) References Cited

U.S. PATENT DOCUMENTS 7,860,386 B2   12/2010   Terashima
8,068,051 B1   11/2011   Osterweil
(Continued)

FOREIGN PATENT DOCUMENTS

CN   103475805 A    12/2013
EP   3 289 430 B1   10/2019
(Continued)

OTHER PUBLICATIONS

International Search Report dated Feb. 21, 2023, issued in an International Application No. PCT/KR2022/018163.
(Continued)

*Primary Examiner* — Timothy J Henn
(74) *Attorney, Agent, or Firm* — Jefferson IP Law, LLP

(57) ABSTRACT

An electronic device is provided. The electronic device includes a display module, a camera module, an ultra-wideband (UWB) communication circuit supporting UWB communication, and at least one processor is disclosed. The at least one processor may be configured to receive radar response information related to a radar reflection signal through the UWB communication circuit, analyze the radar response information to identify the presence of at least one alive object in a first image captured by the camera module, adjust autofocusing of the camera module based on detecting the presence of the at least one alive object, and display a second image captured through the adjusted autofocusing by the camera module on the display module.

21 Claims, 18 Drawing Sheets

(56) References Cited

U.S. PATENT DOCUMENTS

| | | | |
|---|---|---|---|
| 8,502,729 B2 | 8/2013 | Leach, Jr. et al. | |
| 8,717,492 B2 | 5/2014 | McMackin et al. | |
| 8,879,784 B2 | 11/2014 | Sung et al. | |
| 8,970,770 B2 | 3/2015 | Nanu et al. | |
| 9,024,814 B2 | 5/2015 | Bangera et al. | |
| 10,353,066 B2 | 7/2019 | Schwager et al. | |
| 10,613,213 B2 | 4/2020 | Silverstein et al. | |
| 10,690,763 B2 | 6/2020 | Shouldice et al. | |
| 2008/0008361 A1* | 1/2008 | Nozaki | H04N 23/61 |
| | | | 348/E5.042 |
| 2011/0193739 A1* | 8/2011 | Strauch | H04L 27/2647 |
| | | | 342/146 |
| 2014/0118601 A1 | 5/2014 | Myung | |
| 2014/0276090 A1 | 9/2014 | Breed | |
| 2014/0293112 A1 | 10/2014 | Kozinski | |
| 2015/0242982 A1 | 8/2015 | Choi et al. | |
| 2017/0026565 A1 | 1/2017 | Hong et al. | |
| 2017/0064197 A1 | 3/2017 | Leu | |
| 2017/0085771 A1* | 3/2017 | Schwager | H04N 23/72 |
| 2017/0265726 A1 | 9/2017 | Mikami et al. | |
| 2018/0196221 A1 | 7/2018 | Sun et al. | |
| 2019/0208113 A1 | 7/2019 | Sandstrom et al. | |
| 2019/0212125 A1 | 7/2019 | Deleule et al. | |
| 2019/0215436 A1 | 7/2019 | Lee | |
| 2019/0346550 A1* | 11/2019 | Finn | G01S 13/56 |
| 2020/0128203 A1* | 4/2020 | Hirono | H04N 25/77 |
| 2020/0142071 A1 | 5/2020 | Park | |
| 2020/0186722 A1 | 6/2020 | Hu | |
| 2020/0195833 A1 | 6/2020 | Sivan | |
| 2021/0117708 A1 | 4/2021 | Sandhan et al. | |
| 2021/0333381 A1 | 10/2021 | Astrom et al. | |
| 2022/0014681 A1 | 1/2022 | Waitz | |

FOREIGN PATENT DOCUMENTS

| | | |
|---|---|---|
| JP | 2003-241074 A | 8/2003 |
| JP | 2006-340149 A | 12/2006 |
| JP | 2017-228874 A | 12/2017 |
| KR | 10-2011-0082734 A | 7/2011 |
| KR | 10-2017-0025235 A | 3/2017 |
| KR | 10-2018-0073195 A | 7/2018 |
| KR | 10-2019-0140753 A | 12/2019 |
| KR | 10-2073823 B1 | 2/2020 |
| KR | 10-2104408 B1 | 4/2020 |
| WO | 2009/062773 A1 | 5/2009 |
| WO | 2020/107048 A1 | 6/2020 |
| WO | 2020/191142 A1 | 9/2020 |

OTHER PUBLICATIONS

European Search Report dated Nov. 19, 2024, issued in European Application No. 22898946.3.

* cited by examiner

ELECTRONIC DEVICE FOR AUTOFOCUSING AND METHOD OF OPERATING THE SAME

CROSS-REFERENCE TO RELATED APPLICATION(S)

This application is a continuation application, claiming priority under § 365(c), of an International application No. PCT/KR2022/018163, filed on Nov. 17, 2022, which is based on and claims the benefit of a Korean patent application number 10-2021-0167348, filed on Nov. 29, 2021, in the Korean Intellectual Property Office, the disclosure of which is incorporated by reference herein in its entirety.

TECHNICAL FIELD

The disclosure relates to an electronic device for autofocusing and a method of operating the same. More particularly, the disclosure relates to an electronic device to improve autofocusing on alive objects, detect the alive objects, and improve scene understanding and camera focusing by using an ultra-wideband (UWB) radar in overlap with a camera's field of view (FOV).

BACKGROUND ART

A portable electronic device, such as a smartphone may be configured to perform various functions. Examples of the functions may include data and voice communication, capturing images or videos through a camera, voice recording, music file playback through a speaker system, or image or video display. Some electronic devices may be equipped with an additional function for gaming, and other electronic devices may be implemented as multimedia devices.

When an electronic device includes a camera that captures an image or a video, the electronic device may provide an autofocus (AF) function so that a user may conveniently take a picture. AF is a function of automatically focusing during shooting, which allows a user unfamiliar with camera functions to easily capture an image.

Techniques for capturing images have been developed to improve object focusing as well as imaging of scenes. Focusing may be performed automatically by an electronic device or manually by a photographer. In the cause of automatic focusing, the electronic device needs to accurately detect an object to be focused.

The above information is presented as background information only to assist with an understanding of the disclosure. No determination has been made, and no assertion is made, as to whether any of the above might be applicable as prior art with regard to the disclosure.

DISCLOSURE

Technical Problem

When a scene including persons (or alive objects, such as animals) as objects is captured as an image or a video, the objects should be at the center of a screen and captured in as much detail as possible. However, when the objects are in a low-light condition or are located in frames at different distances, or when an image (e.g., a poster, a painting, or a statue) of another person is included in the background, an existing focusing system that guides image characteristics or face recognition may work incorrectly.

This issue may not be completely addressed even by use of a range finder. The range finder only measures the distance to an object, and may not be able to distinguish an alive person as a main subject of a picture from a mannequin or statue. A similar problem may occur, in the case of people wearing various types of masks or helmets or capturing in a low-light condition.

For example, when a scene to be captured includes one face close to the camera, the electronic device may detect only the face close to the camera, fail to detect another person's face in the background, or detect an unintended person's face in the background.

For example, when a scene to be captured includes the face of an alive person, and a face image, such as a portrait, the electronic device may erroneously detect that two faces are present, and create two focuses on both the face of the person and the portrait.

Aspects of the disclosure are to address at least the above-mentioned problems and/or disadvantages and to provide at least the advantages described below. Accordingly, an aspect of the disclosure is to prevent autofocusing failure by recognizing movement and/or a vital sign in a scene.

Another aspect of the disclosure is to improve autofocusing on alive objects, detect the alive objects, and improve scene understanding and camera focusing by using an ultra-wideband (UWB) radar in overlap with a camera's field of view (FOV).

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a display module, a camera module, a UWB communication circuit supporting UWB communication, and at least one processor operatively coupled to the display module, the camera module, and the UWB communication circuit. The at least one processor may be configured to receive radar response information related to a radar reflection signal through the UWB communication circuit. The at least one processor may be configured to analyze the radar response information to identify the presence of at least one alive object in a first image captured by the camera module. The at least one processor may be configured to adjust autofocusing of the camera module based on detecting the presence of the at least one alive object. The at least one processor may be configured to display a second image captured through the adjusted autofocusing by the camera module on the display module.

In accordance with another aspect of the disclosure, a method of operating an electronic device is provided. The method may include receiving radar response information related to a radar reflection signal through a UWB communication circuit. The method may include analyzing the radar response information to identify the presence of at least one alive object in a first image captured by a camera module. The method may include adjusting autofocusing of the camera module based on detecting the presence of the at least one alive object. The method may include displaying a second image captured through the adjusted autofocusing by the camera module on a display module.

Advantageous Effects

An electronic device and a method of the disclosure may improve autofocusing of an alive object that is difficult to detect for reasons, such as a low-light condition, occlusions, a human-like non-alive object, and wearing of a mask or helmet.

An electronic device and a method of the disclosure may generate a multi-focus image by combining high-quality images of persons at different distances from a camera, improve scene understanding using the presence/absence or distances of alive objects, and focus on a nearby or remote alive person.

An electronic device and a method of the disclosure may display information about vital signs of alive objects in a camera preview.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
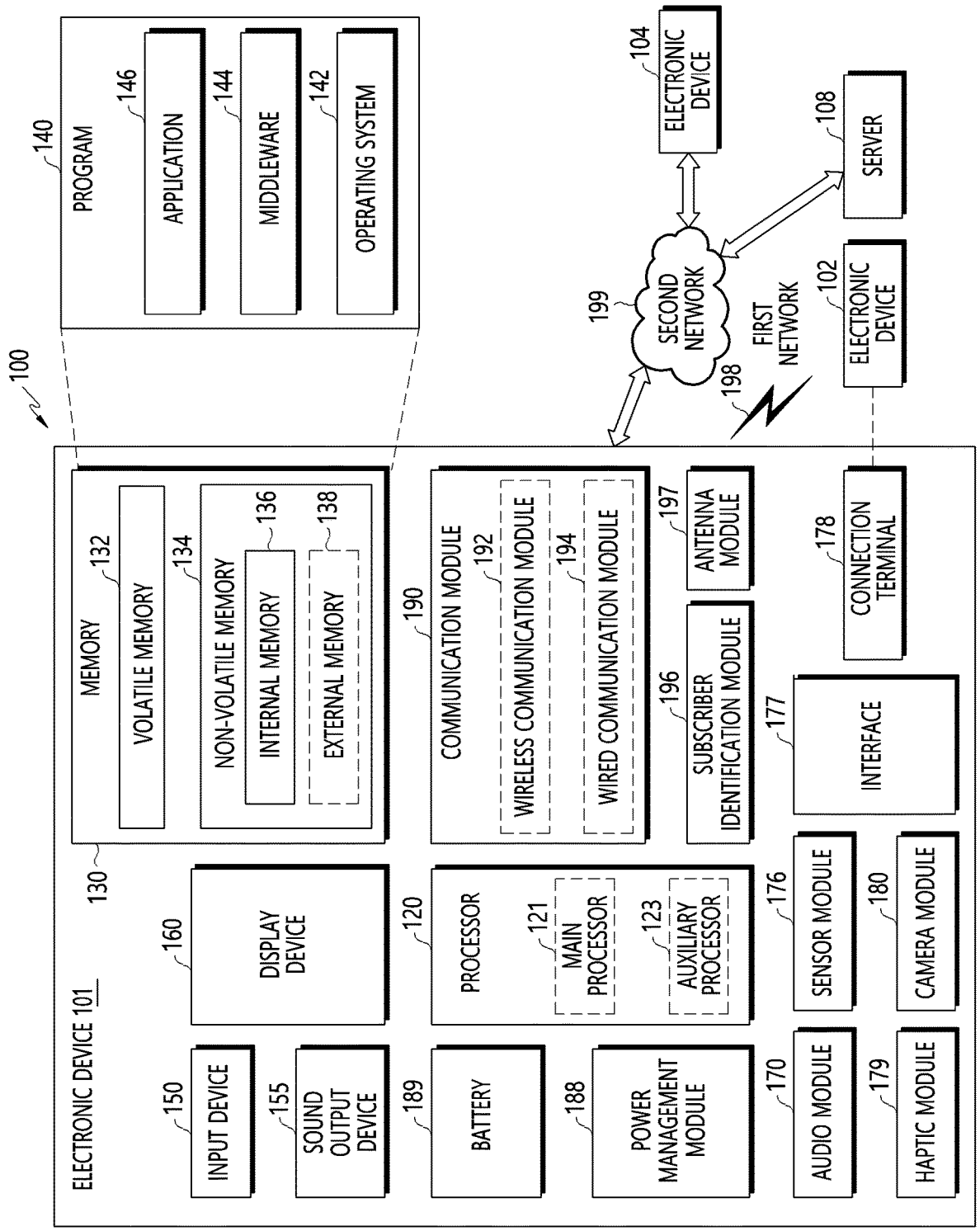
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mm Wave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

In an embodiment of the disclosure, the wireless communication module 192 of the electronic device 101 may include, for example, an ultra-wideband (UWB) communication circuit (e.g., a UWB radar and/or a UWB radar sensor) supporting the UWB communication technology. UWB is a wireless technology developed to transmit data at a high data rate with very little power over a very short range. The UWB short-range radio technology may be used to complement other long-range radio technologies, such as wireless fidelity (Wi-Fi) or worldwide interoperability for microwave access (WiMAX), and cellular broadband communications. UWB was developed to provide more accurate, reliable and efficient short-range communication.

In an embodiment of the disclosure, the electronic device 101 may determine the presence or absence of a person in a predetermined space based on whether or not there are vital signs, such as respiration, heartbeat, and movement by using the UWB communication circuit. Due to a high transmittance of a UWB frequency, the UWB communication circuit may accurately detect vital signs of various alive objects, such as pets as well as humans.

Figure 2:
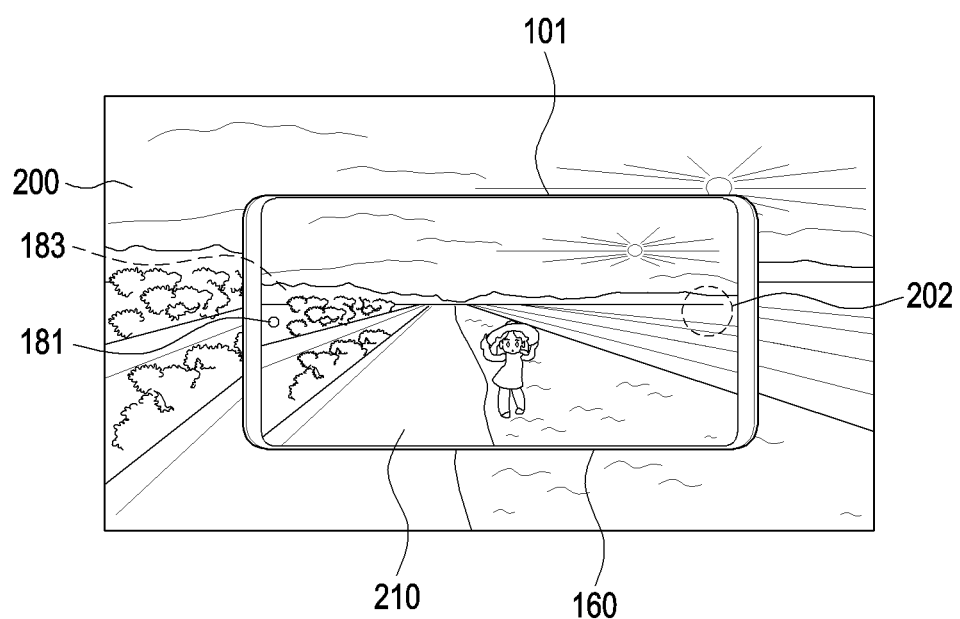
FIG. 2 is a diagram illustrating an image capturing in an electronic device according to an embodiment of the disclosure.

FIG. 2 is a diagram illustrating an image capturing in an electronic device according to an embodiment of the disclosure.

Referring to FIG. 2, the processor 120 of an electronic device (e.g., the electronic device 101 of FIG. 1) may control a camera (e.g., the camera module 180 or an external camera) to capture an image of a scene 200 including a subject (e.g., a person, an animal, a background, and/or a miscellaneous article). In an embodiment of the disclosure, the camera module 180 may include a plurality of cameras having different properties or functions. For example, at least one of the plurality of cameras may be a front camera 181, and at least one other camera may be a rear camera 183.

According to an embodiment of the disclosure, the processor 120 may obtain (or capture) an image (e.g., a preview image) 210 by processing frames received through an image sensor (not shown) of the front camera 181 or the rear camera 183, and control a display module (e.g., the display module 160) to display the image 210. The image 210 may be a preview image displayed before being stored by the front camera 181 or the rear camera 183, and may be an image for which frames input through the image sensor (not shown) are processed and continuously output based on a specified number of frames per second. The processor 120 may obtain the image 210 from the camera module 180 and display the image 210 on the display module 160. In addition, the processor 120 may control the display module 160 to display a shutter button 202 related to storage of the image 210 together with or overlapping with the image 210.

According to an embodiment of the disclosure, the processor 120 may obtain the image 210 including a plurality of objects from a real scene 200 through the front camera 181 or the rear camera 183. The image 210 may be a result obtained by optically processing the scene 200 by the front camera 181 or the rear camera 183. In an embodiment of the disclosure, the processor 120 may analyze the scene 200 based on the image 210 obtained by the front camera 181 or the rear camera 183, and control the camera module 180 to focus on at least one of the plurality of objects. In an embodiment of the disclosure, the scene 200 may include a plurality of objects, which may be various alive or non-alive objects. A user may intend to focus on at least one desired object according to a capturing purpose.

Figure 3A:
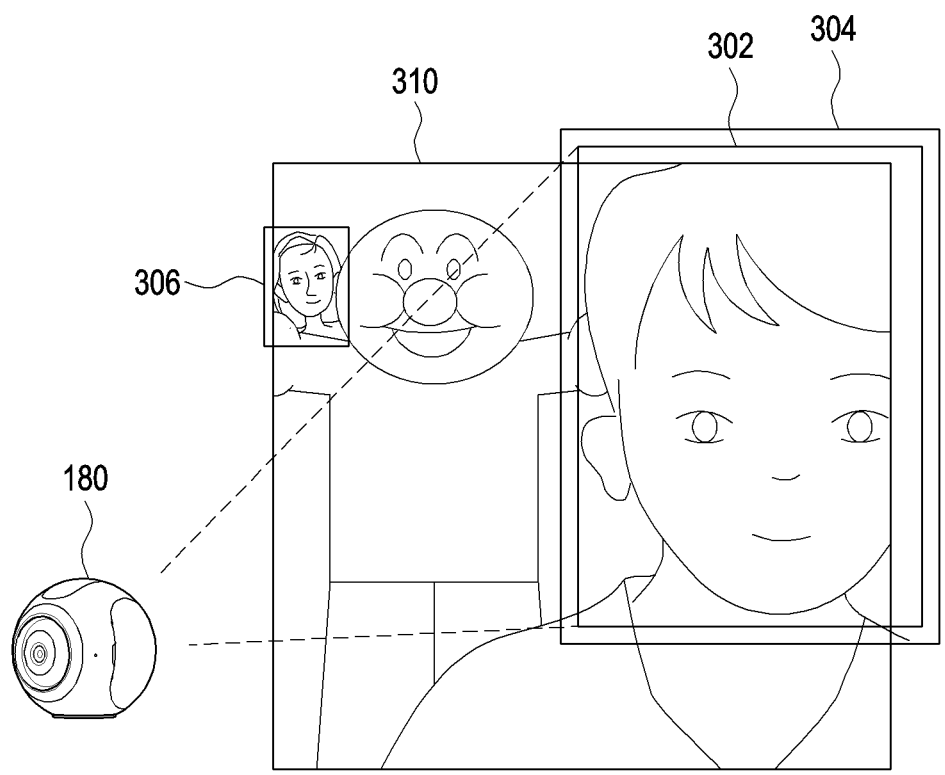
FIGS. 3A and 3B are diagrams illustrating autofocusing by a camera according to various embodiments of the disclosure.
Figure 3B:
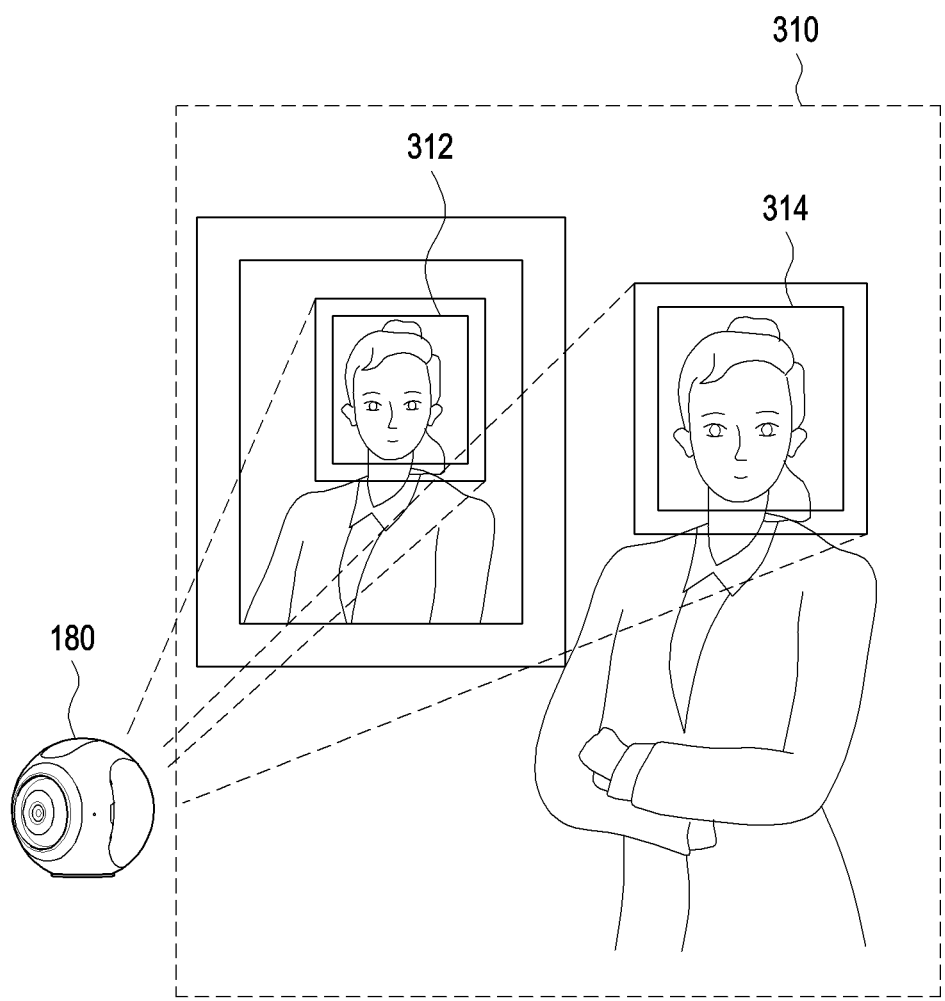

FIGS. 3A and 3B are diagrams illustrating autofocusing of a camera according to various embodiments of the disclosure.

Referring to FIG. 3A, an image 300 captured by the camera module 180 may include two faces (i.e., two persons) 302 and 306. The processor 120 may detect the closer face 302 between the two faces 302 and 306 by analyzing the image 300, and control the camera module 180 to focus on the detected face 302, as indicated by reference numeral 304. In an embodiment of the disclosure, the processor 120 may fail to detect the farther face 306 and miss focusing on the face 306.

Referring to FIG. 3B, an image 310 captured by the camera module 180 may include a face 312 included in a portrait and the face 314 of a real person. The processor 120 may not be able to identify whether the two faces 312 and 314 are real or not only by the image 310 captured by the camera module 180. As a result, the processor 120 may detect both of the faces 312 and 314, and control the camera module 180 to focus on the two faces 312 and 314.

In an embodiment of the disclosure, when executing a camera application, the processor 120 may not apply any scene parameter in a default mode. However, when the camera module 180 is positioned to face a scene including a portrait or a photo, the processor 120 may mistake the face 312 in the portrait or a face in a photo for a real person, and operate the camera module 180 by applying wrong scene optimization parameters (e.g., a portrait mode).

According to an embodiment of the disclosure, vital signs, such as movement, respiration, or heartbeat may be detected in a scene captured by the camera module 180, using a UWB communication circuit which may be included in the wireless communication module 192 of the electronic device 101, and the existence of alive objects detected based on the detected vital signs may be applied to autofocusing of the camera module 180.

Figure 4:
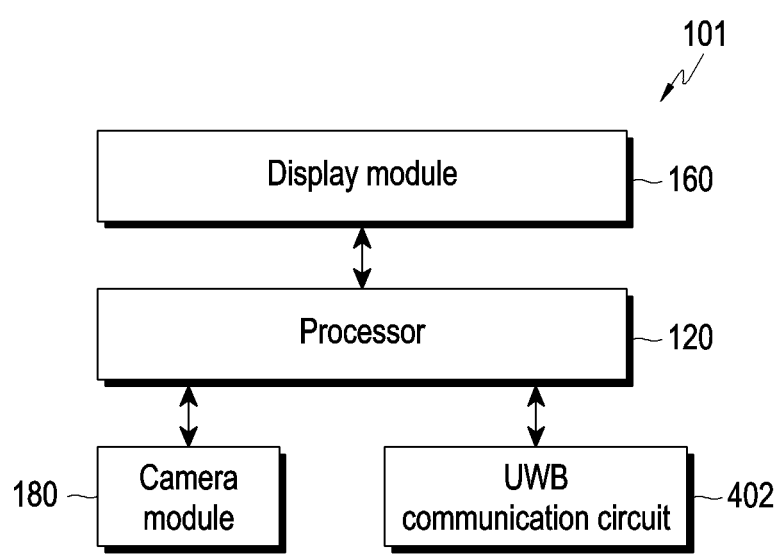
FIG. 4 is a diagram illustrating a configuration of an electronic device using a camera and ultra-wideband (UWB) according to an embodiment of the disclosure.

FIG. 4 is a diagram illustrating a configuration of an electronic device using a camera and UWB according to an embodiment of the disclosure.

Referring to FIG. 4, an electronic device (e.g., the electronic device 101) may include a camera module (e.g., the camera module 180) and a UWB communication circuit 402. In an embodiment of the disclosure, the UWB communication circuit 402 may include a UWB radar sensor, and may be included in the wireless communication module 192 of FIG. 1. The camera module 180 may capture an image from an optical field of view (optical FOV) that may be focused to specific distance(s) in an actual scene, and provide the captured image to the processor 120.

The UWB communication circuit 402 may have a radar field of view (radar FOV) that may include the optical FOV of the camera module 180 or at least partially overlap with the optical FOV of the camera module 180, and collect a radar reflection signal within the radar FOV. In an embodiment of the disclosure, the UWB communication circuit 402 may transmit a radar signal of a specific format through a UWB radar, and collect a radar reflection signal which is the transmitted signal reflected back from an object through the UWB radar sensor. The UWB communication circuit 402 may calculate the distance between the electronic device 101 and the object by measuring the arrival time of the radar reflection signal after the radar signal is transmitted, for example, by the following equation.

> Distance between the electronic device 101 and the object=speed of propagation*signal reflected and returning time/2

Speed of propagation in the air-speed of light C

The radar signal transmitted from the UWB radar of the UWB communication circuit 402 reaches and is reflected from an object (e.g., a thing or a person) located within the radar FOV, and the UWB radar sensor of the UWB communication circuit 402 receives the reflected signal (i.e., referred to as a radar reflection signal). A signal in an area not touching the object is continuously radiated, and only a signal in an area touching the object may be reflected. Part of the radar signal that hits some object (e.g. a person or an animal) may also be transmitted. The electronic device 101 may measure the heart rate of a person or an animal through the UWB communication circuit 402, relying on this property.

In an embodiment of the disclosure, a signal transmitted and received based on UWB may be defined as a signal having a bandwidth higher than a center frequency or a signal having a bandwidth higher than, for example, 0.5 GHz. In an example, the signal may be specified as in a band of 3.1 to 10.6 GHz. The UWB communication circuit 402 may generate very short radio frequency (RF) pulses in the sub-nanosecond range, and use the RF pulses for an object detection and imaging application.

In an embodiment of the disclosure, the UWB communication circuit 402 may include a UWB radar, a UWB radar sensor, and its own processor. The UWB communication circuit 402 may periodically transmit a radar signal having a given signature pulse through the UWB radar, and a radar reflection signal received through the UWB radar sensor may be subjected to processing in a high pass filter (HPF), a low noise amplifier (LNA), and a digital-to-analog converter (DAC), sampled, and then stored in a buffer. Each of the sampled data may indicate how far away from the UWB radar the radar signal has been reflected.

The UWB communication circuit 402 may extract vital signs (e.g., movement, heartbeat and/or respiration) of objects existing within a radar FOV and recognize alive objects among the objects by analyzing radar reflection signals collected by the UWB radar sensor, and calculate distances to the alive objects.

In an embodiment of the disclosure, because an alive object breathes by moving the chest or abdomen, the UWB communication circuit 402 may measure the position of the chest/abdomen, which changes whenever the alive object breathes, to calculate vital signs of the alive object, such as a heart rate and a respiration rate. A change in the distance of the breathing alive object may be measured by measuring the distance of the alive object during a predetermined time t, using the radar signal and the radar reflection signal. This is because position data of the chest/abdomen that moves when the alive object breathes is captured by the UWB communication circuit 402. When the measured position data of the chest/abdomen are arranged in time order, the magnitudes of the position data represents the shape of a waveform that changes at regular intervals over time, and the change in the waveform may coincide with a breathing cycle of an alive object. The UWB communication circuit 402 may calculate a respiration rate using the position data arranged in time order. The respiration rate may be calculated using a time and a waveform interval. For example, when two breaths take 200 ms, the number of breaths per minute may be calculated as 10 breaths (=2*1000 ms/200 ms).

In an embodiment of the disclosure, the UWB communication circuit 402 may determine, as a non-alive object, an object from which no vital signs, such as movement, heartbeat, or respiration are detected.

In an embodiment of the disclosure, the UWB communication circuit 402 may obtain information (referred to as radar response information) about at least one of movement, vital signs, alive-non-alive features, the number, or distances of the objects, based on the radar reflection signal, and provide the obtained information to the processor 120.

In an embodiment of the disclosure, the processor 120 may analyze an image received from the camera module 180 based on the radar response information (e.g., including the number of alive objects and distances to the alive objects) received from the UWB communication circuit 402. In an embodiment of the disclosure, the radar response information may include information about at least one of movement, vital signs, alive-non-alive features, the number, or distances of objects detected by the UWB radar sensor.

In an embodiment of the disclosure, the radar response information provided by the UWB communication circuit 402 may include transmission and reception times of a raw radar signal and a radar reflection signal. The processor 120 may obtain at least one of movement, vital signs, alive-non-alive features, the number, or distances of the objects by analyzing the radar response information, and control the camera module 180 or analyze an image received from the camera module 180, based on the obtained information.

In an embodiment of the disclosure, while the camera module 180 is in operation, the processor 120 may activate the UWB communication circuit 402, and control to provide the radar response information or transmission/reception information to the UWB communication circuit 402. In an embodiment of the disclosure, upon execution of a camera application, the processor 120 may activate the UWB communication circuit 402. In an embodiment of the disclosure, the processor 120 may control the UWB communication circuit 402 to collect a radar reflection signal in a radar FOV overlapping with the FOV of the camera module 180. The UWB communication circuit 402 may transmit a radar signal in response to an activation command from the processor 120, collect a radar reflection signal, for example, from the radar FOV, and provide radar response information generated based on the radar signal and the radar reflection signal to the processor 120.

In an embodiment of the disclosure, the processor 120 may correct the image received from the camera module 180 by controlling autofocusing of the camera module 180 based on the radar response information received from the UWB communication circuit 402 or generated by itself, or applying scene optimization parameters related to color correction, context-based scene understanding, or adaptive compression, and may display the corrected image on a display module (e.g., the display module 160).

In an embodiment of the disclosure, the processor 180 may control the camera module 180 to multi-focus persons at different distances in the image captured by the camera module 180, based on the radar response information received from the UWB communication circuit 402. In an embodiment of the disclosure, the processor 180 may control the camera module 180 to obtain a higher-quality image of alive objects in a low-light condition based on the radar response information received from the UWB communication circuit 402 (e.g., autofocusing). In an embodiment of the disclosure, the processor 120 may perform scene understanding based on detection of an alive object in the image captured by the camera module 180.

Figure 5A:
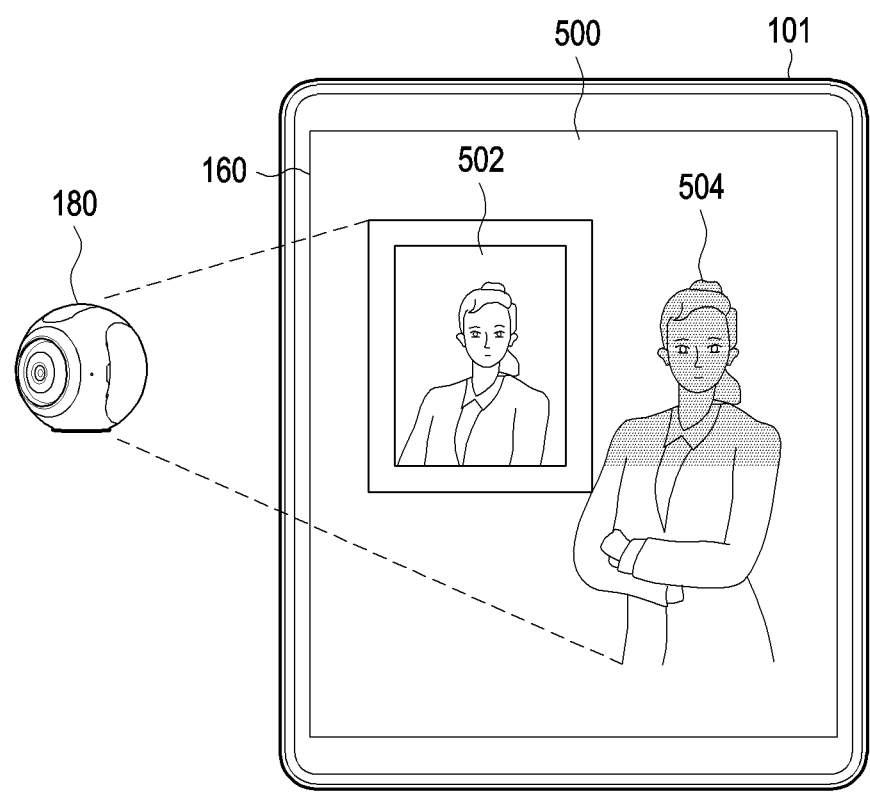
FIGS. 5A and 5B are diagrams illustrating autofocusing based on a camera and UWB according to various embodiments of the disclosure.
Figure 5B:
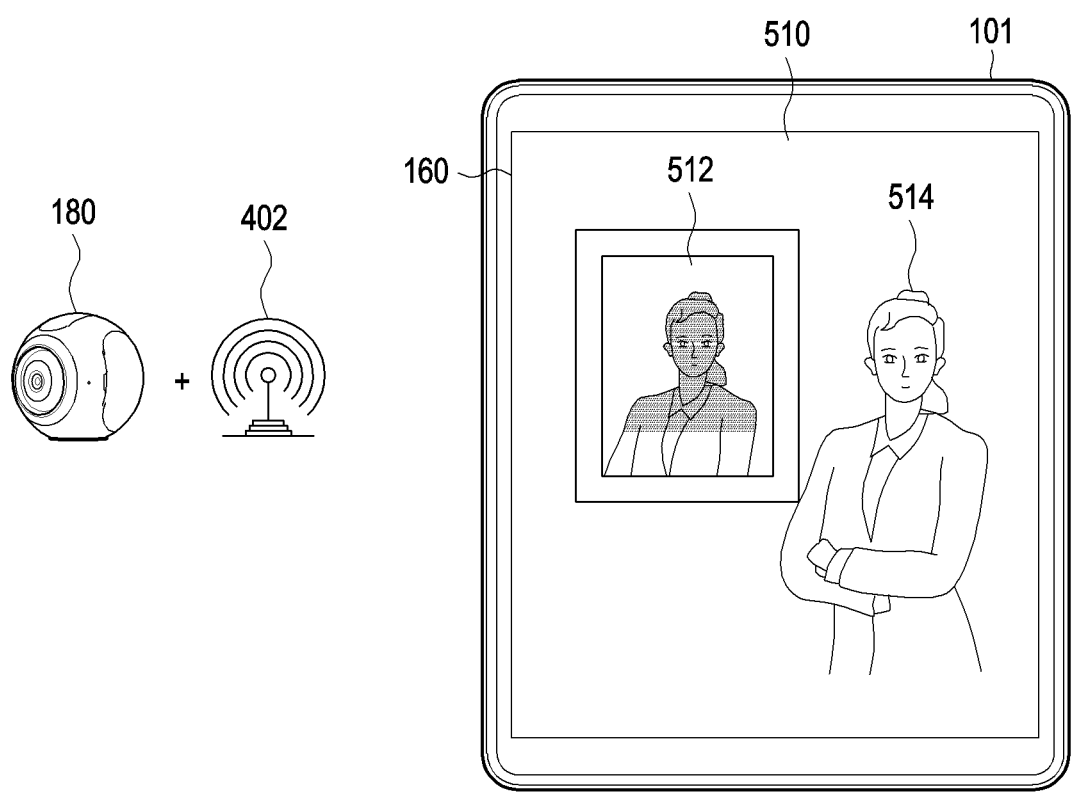

FIGS. 5A and 5B are diagrams illustrating autofocusing based on a camera and UWB according to various embodiments of the disclosure.

Referring to FIG. 5A, an image 500 obtained through the camera module 180 may include a portrait 502 and a real person 504 depicted in the portrait 502. The processor 120 may wrongly recognize that there are two identical persons 502 and 504 in the image 500 by performing camera-based autofocusing on the image 500. Based on the above false recognition, the processor 120 may control the camera module 180 to focus on the portrait 502 located relatively at the center of the image 500, so that the real person 504 is out of focus.

Referring to FIG. 5B, an image 510 obtained through the camera module 180 may include a portrait 512 and a real person 514 depicted in the portrait 512. The processor 120 may obtain radar response information indicating that an alive object exists in a radar FOV overlapping with the image 510 of the camera module 180 based on radar transmission/reception information received from the UWB communication circuit 402. The radar response information may indicate that the person 514 corresponds to an alive object by a vital sign extracted from the person 514, as well as a distance to the person 514 in the image 510. Further, the processor may identify that the portrait 512 in the image 510 corresponds to a non-alive object from the radar response information.

In an embodiment of the disclosure, the processor 120 may control the camera module 180 to focus on the person 514 (or alive object) by performing autofocusing using the radar response information, that is, UWB-based autofocusing. In an embodiment of the disclosure, the processor 120 may adaptively adjust a camera setting (e.g., scene optimization parameters or a scene mode) according to the existence of the person 514 (or alive object), using the radar response information, to provide a higher-quality image of the person 514 (or alive object). In an embodiment of the disclosure, the processor 120 may correct the image received from the camera module 180 to provide a higher-quality image of the person 514 (or alive object), using the radar response information.

Figure 6:
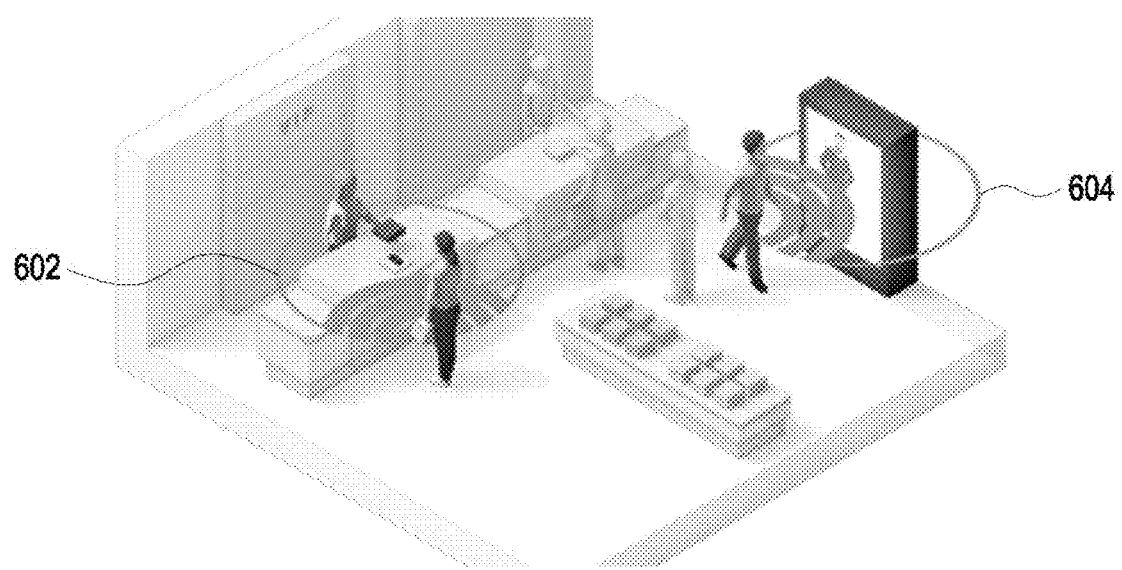
FIG. 6 is a diagram illustrating UWB-based scene understanding according to an embodiment of the disclosure.

FIG. 6 is a diagram illustrating UWB-based scene understanding according to an embodiment of the disclosure.

Referring to FIG. 6, the processor 120 of the electronic device 101 may provide the following functions through scene understanding using a UWB communication circuit (e.g., the UWB communication circuit 402).

Detection of humans (or alive objects) 602

Detection of a non-alive human image 604

In an embodiment of the disclosure, the radar response information obtained through the UWB communication circuit 402 may additionally enable the electronic device 101 to detect moving object(s) and/or detect the absence of alive objects.

Figure 7:
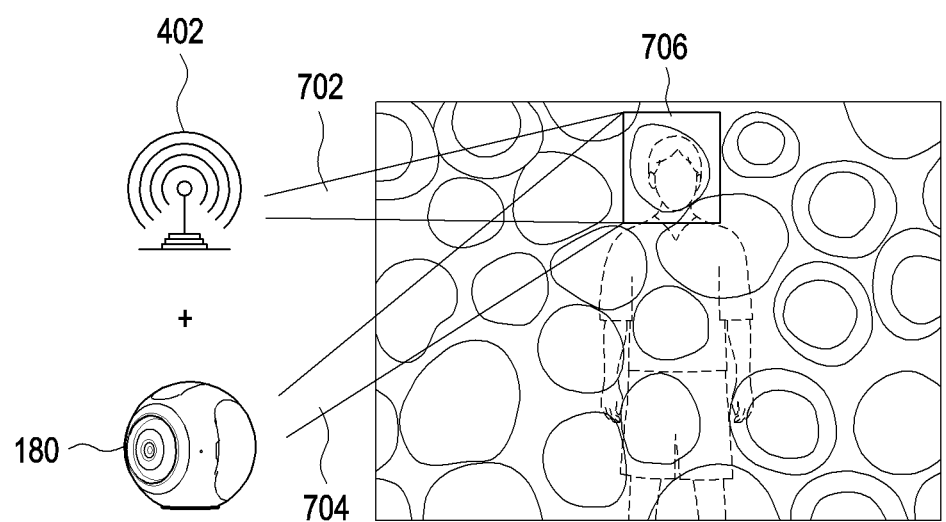
FIG. 7 is a diagram illustrating UWB-based autofocusing according to an embodiment of the disclosure.

FIG. 7 is a diagram illustrating UWB-based autofocusing according to an embodiment of the disclosure.

Referring to FIG. 7, a real scene 706 may include an alive object (e.g., a human) having a protective color similar to that of the background. The camera module 180 may obtain an optical image 704 of the real scene 706, and the UWB communication circuit 402 may obtain radar transmission/ reception information 702 (radar response information) for the real scene 706. When a living person (or alive object) in the optical image 704 has a protective color or makeup similar to the background, it may be difficult for the processor 120 of the electronic device 101 to detect the existence of the living person (or alive object) only with the optical image 704. When the processor 120 detects a vital sign (e.g., movement, heartbeat, or respiration) based on the radar transmission/reception information 702 (the radar response information), the processor may determine that there is a living person (or alive object) in the optical image 704.

In an embodiment of the disclosure, upon detection of a person (or alive object) included in the optical image 704 based on the radar transmission and reception information 702 (the radar response information) obtained from the UWB communication circuit 402, the processor 120 may control the camera module 180 to automatically focus on the detected person (or alive object). In an embodiment of the disclosure, the processor 120 of the electronic device 101 may calculate or obtain a distance to a moving object included in the optical image 704 based on the radar transmission/reception information 702 (the radar response information) obtained from the UWB communication circuit 402. In an embodiment of the disclosure, when the distance to the moving object is obtained based on the radar transmission/reception information 702 (the radar response information), the camera module 180 may more accurately focus on the detected moving object based on the distance.

Figure 8:
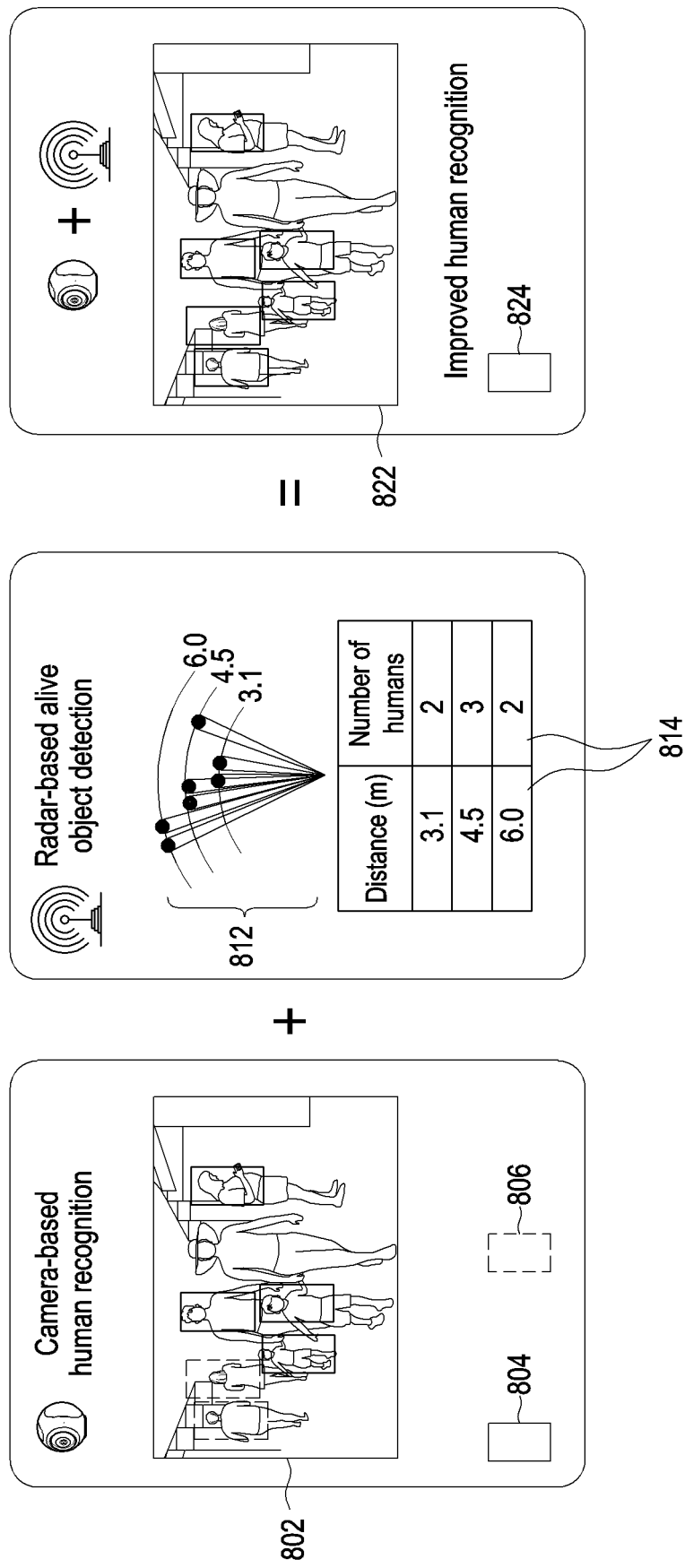
FIG. 8 is a diagram illustrating human recognition using a camera and UWB according to an embodiment of the disclosure.

FIG. 8 is a diagram illustrating human recognition based on a camera and UWB according to an embodiment of the disclosure.

Referring to FIG. 8, an image 802 captured by the camera module 180 may include a plurality of persons. The processor 120 may recognize some of the persons 804 by applying a camera-based human recognition technology based on the image 802 obtained from the camera module 180, while failing to recognize the remaining persons 806.

In an embodiment of the disclosure, the processor 120 may detect alive objects based on radar transmission/reception information 812 (the radar response information) obtained by the UWB communication circuit 402, thereby improving the image 802 obtained from the camera module 180. The processor 120 may generate an alive object list 814 by analyzing the radar transmission/reception information 812 (the radar response information). In an embodiment of the disclosure, the alive object list 814 may include distances at which persons are detected and the number of persons per distance. For example, two persons may exist within a distance range of 3.1 meters, three persons may exist within a distance range of 4.5 meters, and two persons may exist within a distance range of 6.0 meters.

In an embodiment of the disclosure, the processor 120 may succeed in improved human recognition and obtain a corrected image 822 in which living persons are recognized, by improving the image 802 based on the radar transmission/reception information 812 (the radar response information). In an embodiment of the disclosure, the processor 120 may obtain the corrected image 822 by controlling the camera module 180 to accurately focus on active and moving objects that are in a low-light condition and/or have a protective color based on the alive object list 814. In an embodiment of the disclosure, the corrected image 822 may be obtained by directly correcting the image (e.g., the image 802) that the processor 120 has obtained from the camera module 180.

In an embodiment of the disclosure, the processor 120 may perform context-based scene understanding based on the alive object list 814. In an embodiment of the disclosure, the processor 120 may improve a security function through face recognition 824 by preventing hacking involving a non-alive picture or a three-dimensional (3D) face, based on the life object list 814.

Figure 9:
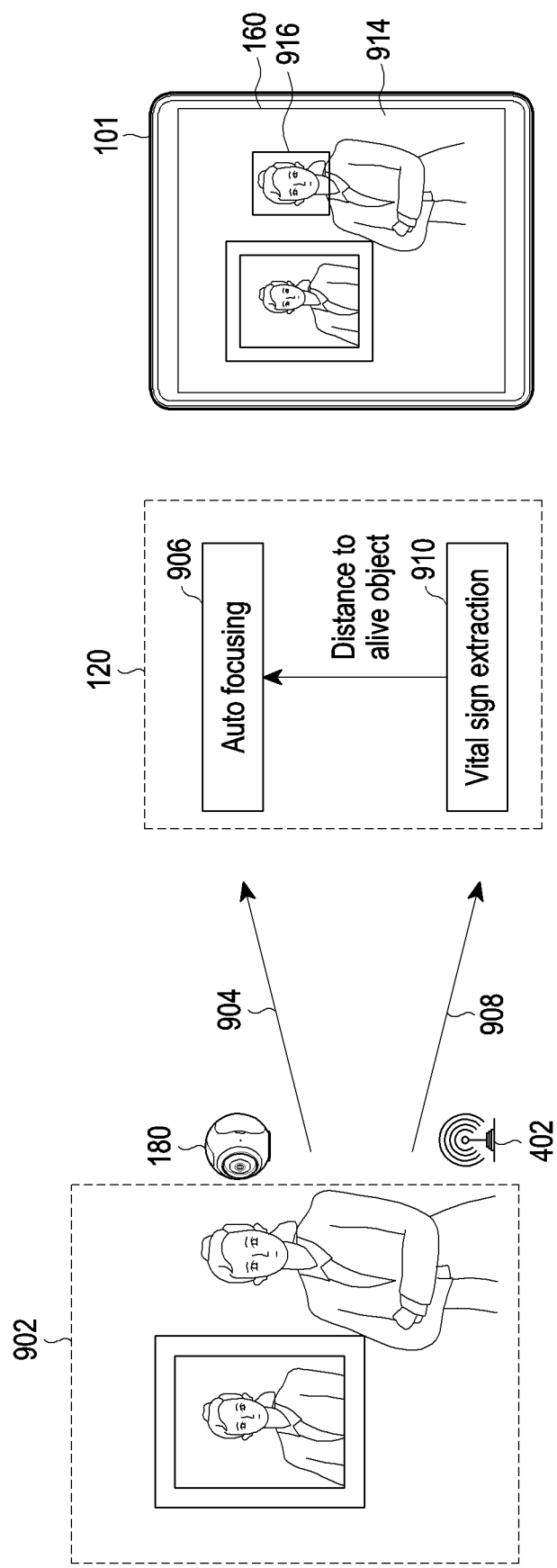
FIG. 9 is a diagram illustrating an image correction using a camera and UWB according to an embodiment of the disclosure.

FIG. 9 is a diagram illustrating an image correction based on a camera and UWB according to an embodiment of the disclosure.

Referring to FIG. 9, a real scene 902 may include both a portrait and the face of a real person. The camera module 180 may obtain an image 904 (e.g., an optical image) from the real scene 902, and the UWB communication circuit 402 may obtain radar transmission/reception information 908 (radar response information) from the real scene 902.

In an embodiment of the disclosure, the processor 120 may include an autofocusing unit 906 receiving the image 904 as an input and a vital sign extraction unit 910 receiving the radar transmission/reception information 908 (or the radar response information) as an input. In an embodiment of the disclosure, the functional units 906 and 910 may be hardware included in the processor 120 or software executed by the processor 120.

The vital sign extraction unit 910 may receive the radar transmission/reception information 908 (or the radar response information), extract vital signs from the real scene 902 based on the radar transmission/reception information 908 (or the radar response information), and calculate a distance to the alive object (i.e., living person). Information about the distance to the alive object may be transmitted to the autofocusing unit 906.

In an embodiment of the disclosure, the autofocusing unit 906 may receive the image 904 and the distance to the alive object, and control the camera module 180 to focus on the alive object based on the distance to the alive object. The camera module 180 may capture an image 914 with an autofocus adjusted by the autofocusing unit 906. The camera module 180 may obtain the adjusted image 914 by autofocusing on a real person 916 present in the real scene 902. In an embodiment of the disclosure, the processor 120 may control the camera module 180 to perform color correction, scene understanding, or adaptive compression based on the existence of the alive object and the distance to the alive object.

Figure 10:
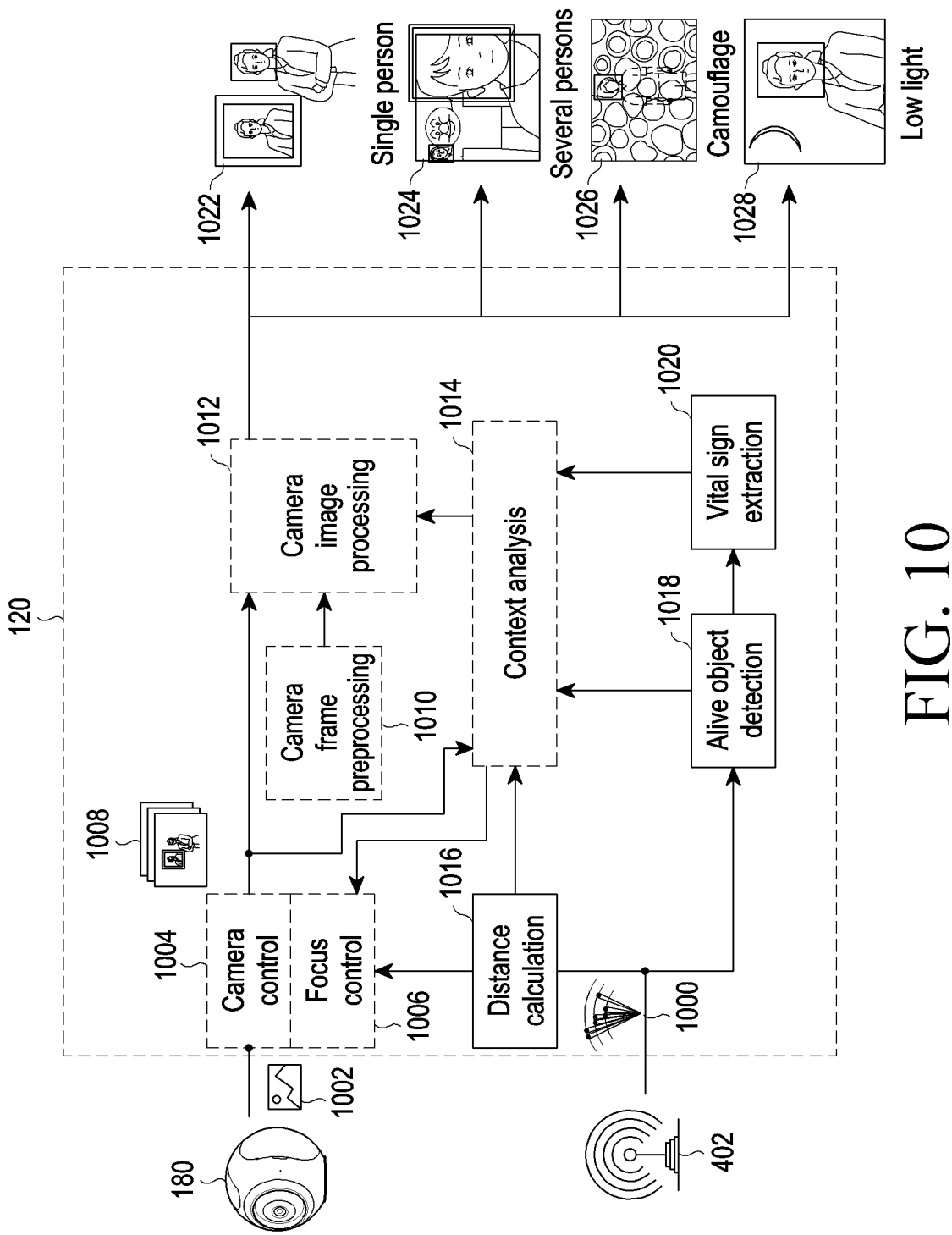
FIG. 10 is a diagram illustrating an image processing procedure using a camera and UWB according to an embodiment of the disclosure.

FIG. 10 is a diagram illustrating an image processing procedure using a camera and UWB according to an embodiment of the disclosure.

Referring to FIG. 10, the processor 120 may communicate with the camera module 180 and the UWB communication circuit 402, and include at least one of a camera control unit 1004, a focus control unit 1006, a camera frame preprocessing unit 1010, a camera image processing unit 1012, a context analysis unit 1014, a distance calculation unit 1016, an object detection unit 1018, or a vital sign extraction unit 1020. may include In an embodiment of the disclosure, at least one of the functional units 1010, 1012, 1014, 1016, 1018, and 1020 may be implemented as hardware included in the processor 120 or software executed by the processor 120.

In an embodiment of the disclosure, the camera module 180 may input a captured image of a real scene 1002 to the processor 120. The camera control unit 1004 may transmit camera frames 1008 included in the image received from the camera module 180 to the camera image processing unit 1012 and the camera frame preprocessing unit 1010. The camera frame preprocessing unit 1010 may perform preprocessing on the camera frames 1008 to provide information about a face detected based on a light condition or a camera to the camera image processing unit 1012.

In an embodiment of the disclosure, the UWB communication circuit 402 may collect radar transmission/reception information through a radar FOV that may overlap with an optical FOV of the camera module 180, and input radar response information 1000 obtained by analyzing the radar transmission/reception information to the processor 120. In an embodiment of the disclosure, the radar response information 1000 may include information about a distance for autofocusing of the camera module 180. In an embodiment of the disclosure, the radar response information 1000 may include information indicating the presence or absence of at least one object having a vital sign (i.e., at least one life object), and vital signs for scene understanding. In an embodiment of the disclosure, the radar response information 1000 may include the number and distances of alive objects. In an embodiment of the disclosure, the UWB communication circuit 402 may provide raw radar transmission/reception information to the processor 120, instead of the radar response information 1000, and the processor 120 may detect the radar response information 1000 by analyzing the radar transmission/reception information.

In an embodiment of the disclosure, the distance calculation unit 1016 may obtain a distance to at least one object having a vital sign (i.e., at least one alive object) from the radar response information. Information about the distance may be transmitted to the focus control unit 1006, and the focus control unit 1006 may control autofocusing of the camera module 1080 based on the distance. The information about the distance may also be transmitted to the context analysis unit 1014.

In an embodiment of the disclosure, the object detection unit 1018 may identify at least one object distinguishable based on the radar response information, determine whether each identified object is an alive object having a vital sign, and transmit alive-non-alive feature information to the context analysis unit 1014. The vital sign extraction unit 1020 may receive information on vital signs through the object detection unit 1018 or directly extract vital signs from the radar response information, and transmit values of the vital signs to the context analysis unit 1014.

In an embodiment of the disclosure, the context analysis unit 1014 may receive the camera frames 1008, and perform context-based scene understanding on the camera frames 1008 based on the distances received from the distance calculation unit 1016, the alive-non-alive feature information received from the object detection unit 1018, and the values of the vital signs received from the vital sign extraction unit 1020. A result of the scene understanding may include image processing information according to a context environment or the number and distances of alive objects, and may be transmitted to the camera image processing unit 1012.

In an embodiment of the disclosure, the camera image processing unit 1012 may receive the camera frames 1008, perform a correction algorithm, such as image compression or color correction, based on a lighting condition received from the camera frame preprocessing unit 1010, the context environment or the image processing information based on the number and distances of the alive objects, received from the context analysis unit 1014, and output improved images 1022, 1024, 1026, and 1028 including scene descriptions.

In an embodiment of the disclosure, the image 1022 may be provided with a scene description of a person, such as "a woman standing in front of a painting", with a focus on a real person instead of a mannequin, a sculpture, a photo, an image in a mirror, or a portrait. The real person in the image 1022 may be detected based on a vital sign, and focused based on a distance to the alive object.

In an embodiment of the disclosure, the image 1024 may include a plurality of persons, and may be a multi-focus image of a plurality of real persons. The plurality of real persons in the image 1024 may be detected based on vital signs, and focused based on respective distances to the alive objects.

In an embodiment of the disclosure, the image 1026 may include an alive object (e.g., a crocodile in a grass) covered with a protective color, and may be an image in which an alive object is focused in the background. The alive object in the image 1026 may be detected based on a vital sign, and may be focused based on a distance to the alive object.

In an embodiment of the disclosure, the image 1028 may include a real person captured in a low-light condition, and may be an image in which the real person is focused in the low-light condition. In the low-light condition, it may be difficult to focus on an alive object existing in a scene only by the image 1026 captured from the camera module 180. However, the UWB communication circuit 402 may detect the alive object without any obstacle. The living person in the image 1028 may be detected based on a vital sign, and as the cameral module 180 is controlled to focus on the living person based on a distance calculated based on the radar transmission/reception information, the camera image processing unit 1012 may generate the high-contrast image 1028.

In an embodiment of the disclosure, the processor 120 may control the camera module 180 to focus on a living person in a low-light condition based on a distance calculated based on the radar transmission/reception information from the UWB communication circuit 402, and obtain a high-contrast image through the controlled camera module 180.

In an embodiment of the disclosure, the processor 120 may improve the image quality of a living person in a scene including an image of a person in a painting, a poster, a screen, a picture gallery, a movie, or a photo of a shopping mall, a mannequin, a wax figure, a sculpture, or a mirror, or a scene in which a living person is hidden by an obstacle, based on information about the existence of a living person, obtained based on the radar transmission/reception information from the UWB communication circuit 402. In an embodiment of the disclosure, the processor 120 may more accurately detect a face that has turned around or a face covered by a mask, a helmet, makeup, or an obstacle in a medical sensor, a quarantine, or a carnival event, and improve the image quality of a living person.

In an embodiment of the disclosure, the processor 120 may improve the image quality of an image including an alive object having a protective color (e.g., an animal having a protective color or a person wearing makeup) by focusing on the alive object based on information about the existence of a living person, obtained based on the radar transmission/reception information from the UWB communication circuit 402. In an embodiment of the disclosure, the processor 120 may control the camera module 180 to provide multi-focusing on a plurality of persons at different distances to the camera module 180. In an embodiment of the disclosure, the processor 120 may increase a security level by preventing hacking based on a non-alive photo or a 3D face shape other than a living person in face recognition.

Figure 11:
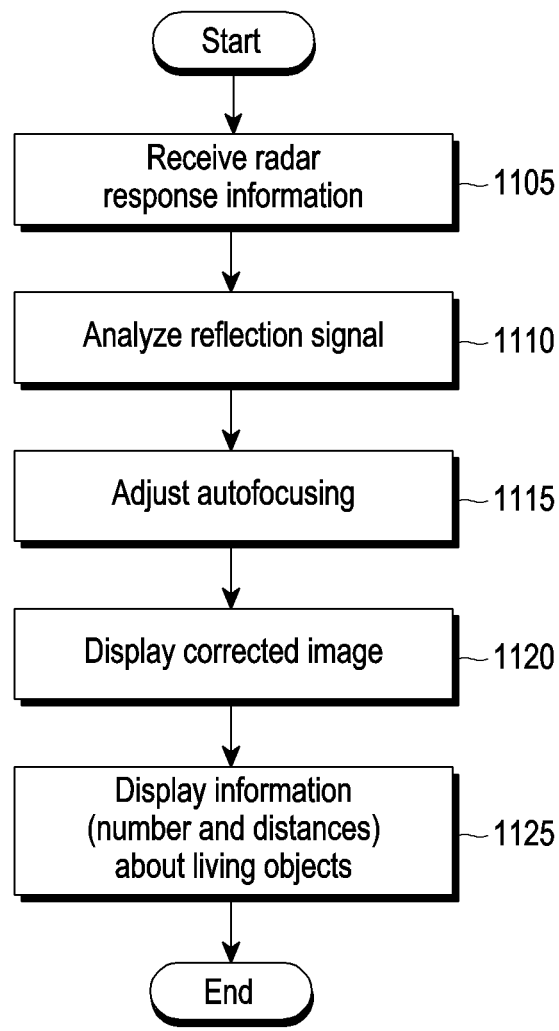
FIG. 11 is a flowchart illustrating an autofocusing method using a camera and UWB according to an embodiment of the disclosure.

FIG. 11 is a flowchart illustrating an autofocusing method based on a camera and UWB according to an embodiment of the disclosure.

Referring to FIG. 11, in operation 1105, the processor 120 of the electronic device 101 may receive radar response information from a UWB communication circuit (e.g., the UWB communication circuit 402). In an embodiment of the disclosure, the radar response information may be provided from a radar FOV that may overlap with an optical FOV of a camera module (e.g., the camera module 180) by the UWB communication circuit 402.

In operation 1110, the processor 120 may analyze the radar response information to determine whether an alive object exists in an image captured by the camera module 180. In an embodiment of the disclosure, the processor 120 may identify objects in a scene and calculate a distance to each object by analyzing a transmission time of a radar signal and a reception time of a radar reflection signal included in the radar response information. In an embodiment of the disclosure, the processor 120 may extract vital signs (e.g., at least one of movement, heartbeat, or respiration) for the objects in the scene by analyzing the radar response information, and identify alive objects among the objects based on the vital signs.

In operation 1115, the processor 120 may adjust autofocusing of the camera module 180 based on the radar response information. In an embodiment of the disclosure, the radar response information may include alive-non-alive feature information indicating whether an alive object exists. In an embodiment of the disclosure, the radar response information may include the number of alive objects and a distance to each alive object. In an embodiment of the disclosure, the radar response information may include at least one of a distance to each object, a vital sign, alive-non-alive features, whether an alive object exists, or the number of objects. The processor 120 may control the camera module 180 to focus on each alive object based on the radar response information.

In operation 1120, the processor 120 may display the image captured from the camera module 180 on the display module 160 through the adjusted autofocusing. In an embodiment of the disclosure, the processor 120 may additionally correct the image captured by the camera module 180 based on the radar response information and then display the corrected image on the display module 160.

In operation 1125, the processor 120 may display, on the display module 160, information related to alive objects obtained from the radar response information, for example, the number and distances of the alive objects, along with the image. In an embodiment of the disclosure, the processor 120 may display information indicating an alive object identified based on the radar response information, for example, a square indicating the face of an identified person, together with the image.

Figure 12:
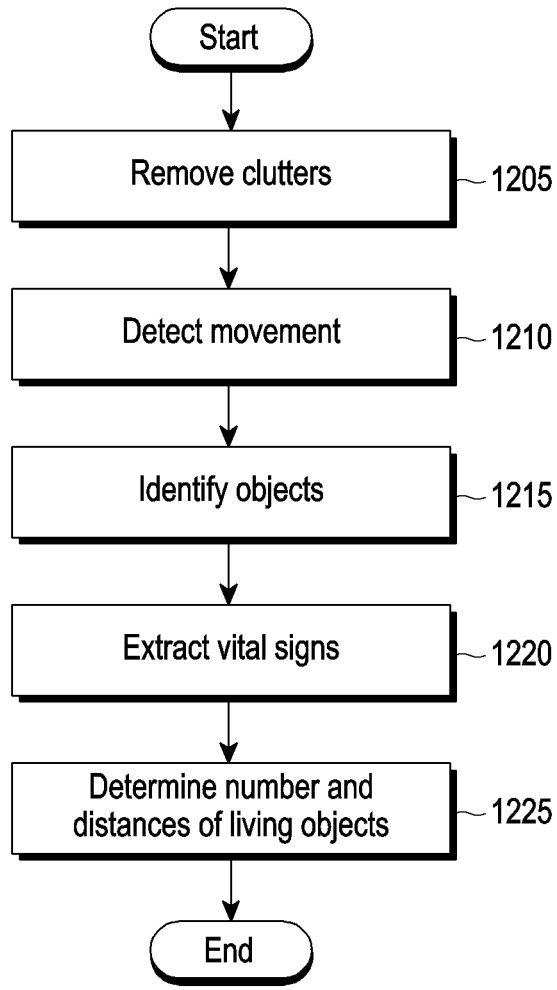
FIG. 12 is a flowchart illustrating a procedure of analyzing a radar reflection signal according to an embodiment of the disclosure.

FIG. 12 is a flowchart illustrating a procedure of analyzing a radar reflection signal according to an embodiment of the disclosure. In an embodiment of the disclosure, the operations of FIG. 12 may correspond to operation 1110.

Referring to FIG. 12, in operation 1205, the processor 120 of the electronic device 101 may remove clutters included in a radar reflection signal by analyzing transmission/reception information about a radar signal and the radar reflection signal, received from the UWB communication circuit 402. The clutters may include unintended signals reflected from static objects (i.e., objects that do not make movement) other than a target, for example, from the ground, a sea level, a building, a floor, a ceiling, or a wall, and received at the radar. In an embodiment of the disclosure, the clutters may be removed by at least one of an averaging filter, a loop-back filter, or a Kalman filter. The processor 120 may obtain a radar reflection signal corresponding to the moving objects by removing the clutters.

In operation 1210, the processor 120 may detect the movement of objects included in a scene based on the (de-cluttered) radar reflection signal. In an embodiment of the disclosure, the processor 120 may use the radar reflection signal accumulated for a specified time (e.g., 0.5 seconds) to detect the movement. In an embodiment of the disclosure, the processor 120 may detect a cluster (i.e., distance range) having moving objects by executing a signal processing filtering technique based on a threshold.

In operation 1215, the processor 120 may identify and classify the moving objects (e.g., including a person) included in the scene by detecting the movement. In an embodiment of the disclosure, the processor 120 may detect a cluster having a meaningful amplitude (i.e., movement) by applying spectral transform, for example, wavelet transform to obtain the spectrum of the (de-cluttered) radar reflection signal. A principal component analysis (PCA) technique may be applied to reduce the distance dimension of each detected cluster. In an embodiment of the disclosure, the processor 120 may detect a cluster including persons by using a specified pattern matching (e.g., a human respiration rate is 12 to 16 cycles per minute) against a radar reflection signal accumulated for a specified time (e.g., 3 seconds).

In operation 1220, the processor 120 may extract vital signs (e.g., heartbeat or respiration) from the classified objects. Based on the vital signs, the processor 120 may detect alive objects from among the classified objects. In an embodiment of the disclosure, the processor 120 may extract vital signs, using pattern recognition machine learning and signal processing techniques (e.g., signal decomposition for respiration or heartbeats). In an embodiment of the disclosure, the processor 120 may detect whether an object having a vital sign (e.g., a person) exists and/or how many persons exist in each cluster. For example, in FIG. 8, the processor 120 may detect the presence of two persons at a distance of 3.1 meters based on a UWB signal and, if necessary, detect that the respiration rate is 1.55 Hz.

In operation 1225, the processor 120 may determine the number of detected alive objects and distances to the individual alive objects. In an embodiment of the disclosure, for each of a plurality of distance ranges, the processor 120 may determine the number of alive objects included in the same distance range and generate an alive object list indicating the numbers of alive objects in the distance ranges. In an embodiment of the disclosure, the alive object list may be used for autofocusing in operation 1115. In an embodiment of the disclosure, the alive object list may be displayed together with an image (or an image with corrected autofocusing) including the scene on the display module 160 in operation 1125.

Figure 13:
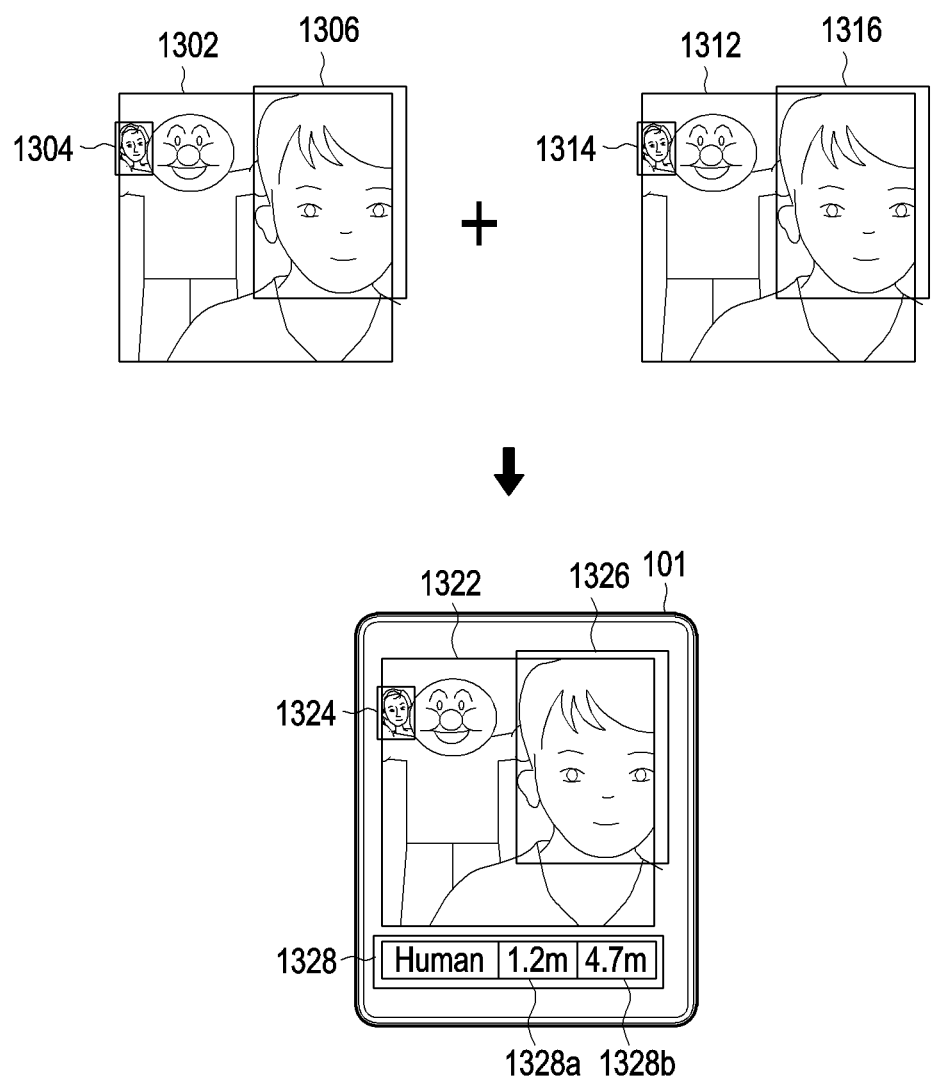
FIG. 13 is a diagram illustrating multi-focusing using a camera and UWB according to an embodiment of the disclosure.

FIG. 13 is a diagram illustrating multi-focusing based on a camera and UWB according to an embodiment of the disclosure.

Referring to FIG. 13, an image 1302 of a real scene captured through the camera module 180 may include a near person 1306 and a far person 1304, and the camera module 180 may generate the image 1302 by focusing on the near person 1306 under the control of the processor 120. A captured image 1312 of the same scene may include a near person 1316 and a far person 1314, and the camera module 180 may generate the image 1312 by focusing on the far person 1314.

In an embodiment of the disclosure, the processor 120 may generate a multi-focused image 1322 by combining the image 1302 focusing on the near person 1306 with the image 1312 focusing on the far person 1314, and display the multi-focused image 1322 on the display module 160 of the electronic device 101. The multi-focused image 1322 may include both a focused far person 1324 and a focused near person 1326.

In an embodiment of the disclosure, the processor 120, the processor 120 may display information 1328 about the persons 1324 and 1326 included in the scene, along with the multi-focused image 1322. In an embodiment of the disclosure, the information 1328 may include a distance to each of the living persons included in the scene, that is, the distance to the near person 1326, for example, 1.2 m 1328a, and the distance to the far person 1324, for example, 4.7 m 1328b.

Figure 14:
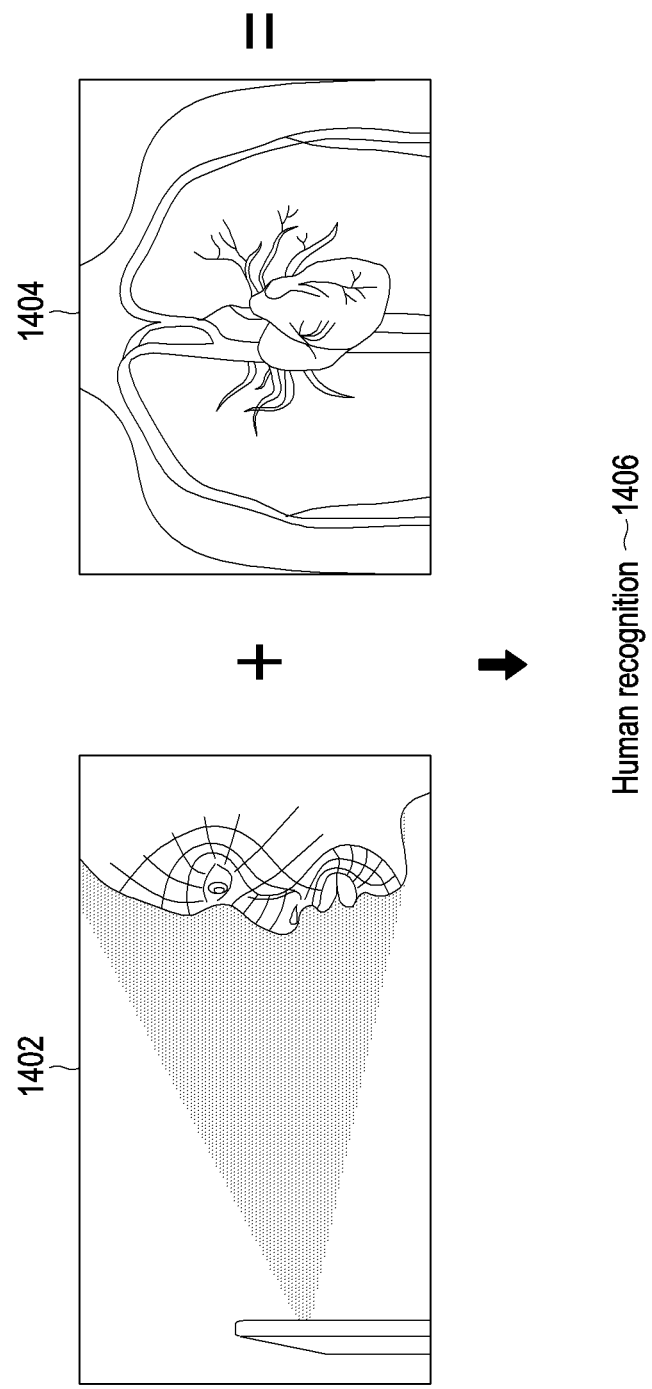
FIG. 14 is a diagram illustrating face recognition using a camera and UWB according to an embodiment of the disclosure.

FIG. 14 is a diagram illustrating face recognition based on a camera and UWB according to an embodiment of the disclosure.

Referring to FIG. 14, the processor 120 may capture an image of a face 1402 of an intended user for face recognition through the camera module 180, while extracting a vital sign 1404 of the user, using the UWB communication circuit 402. The processor 120 may determine that the face 1402 of the user has been captured from a living person based on radar response information from the UWB communication circuit 402, and analyze the face 1402, thereby succeeding in face recognition 1406. In an embodiment of the disclosure, when at least one alive object is not detected by the UWB communication circuit 402 during the face recognition, or a vital sign is not extracted from an image of an intended user for face recognition, the processor 120 may determine that the face recognition for a security function has failed.

Figure 15A:
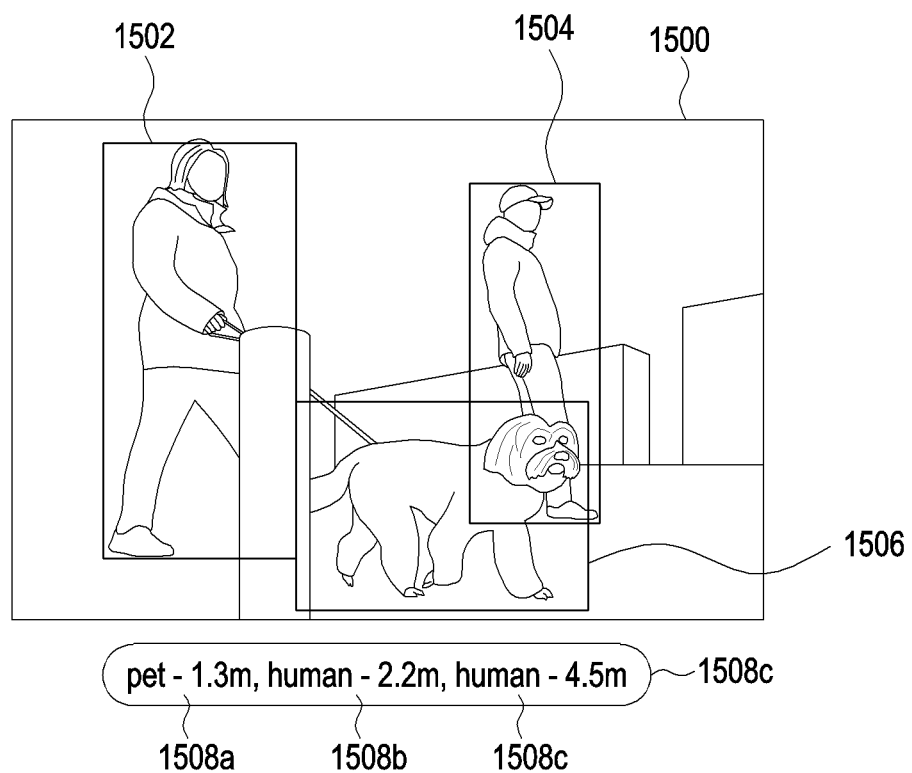
FIGS. 15A and 15B are diagrams illustrating a scene understanding using a camera and UWB according to various embodiments of the disclosure.
Figure 15B:
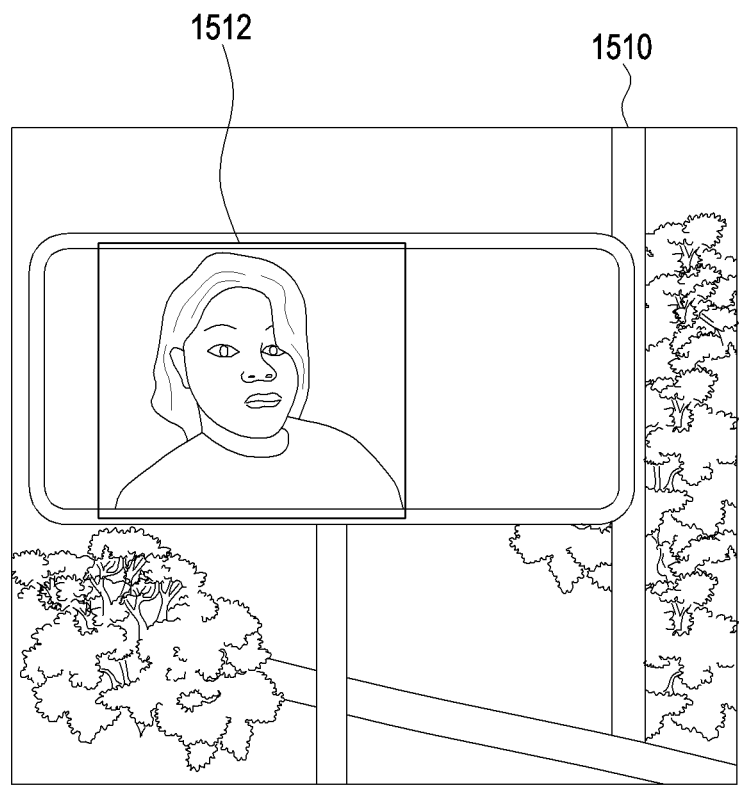

FIGS. 15A and 15B are diagrams illustrating a scene understanding based on a camera and UWB according to various embodiments of the disclosure.

Referring to FIG. 15A, an image 1506 captured by the camera module 180 may include two persons 1502 and 1504 and an animal 1506 at different distances on a road. The processor 120 may detect that the objects 1502, 1504 and 1506 included in the image 1506 are alive objects based on radar response information from the UWB communication circuit 402, and display a scene description 1508 of the generated image 1506 together with the image 1506 generated based on the radar response information. In an embodiment of the disclosure, the scene description 1508 may indicate [animal-1.3 m 1508a, human-2.2 m 1508b, human-4.5 m 1508c].

Referring to FIG. 15B, an image 1510 captured by the camera module 180 may include an image 1512 of a person, which is a non-alive object in an advertisement sign installed on a roadside. The processor 120 may detect that the object 1512 included in the image 1510 is a non-alive object based on radar response information from the UWB communication circuit 402, and display a scene description 1514 together with the image 1510. In an embodiment of the disclosure, the scene description 1514 may indicate ["No alive objects"].

According to an embodiment of the disclosure, the electronic device 101 may include the display module 160, the camera module 180, the UWB communication circuit 402 supporting UWB communication, and the at least one processor 120 operatively coupled to the display module, the camera module, and the UWB communication circuit. The at least one processor may be configured to receive radar response information related to a radar reflection signal through the UWB communication circuit. The at least one processor may be configured to analyze the radar response information to identify the presence of at least one alive object in a first image captured by the camera module. The at least one processor may be configured to adjust autofocusing of the camera module based on detecting the presence of the at least one alive object. The at least one processor may be configured to display a second image captured through the adjusted autofocusing by the camera module on the display module.

According to an embodiment of the disclosure, the UWB communication circuit may be configured to generate the radar response information based on a radar reflection signal obtained from a radar FOV overlapping with an optical FOV of the camera module.

According to an embodiment of the disclosure, the at least one processor may be configured to control the camera module to focus on the at least one alive object detected through analysis of the radar response information.

According to an embodiment of the disclosure, the at least one processor may be configured to display, on the display module, scene description information related to the at least one alive object, together with the second image.

According to an embodiment of the disclosure, the scene description information may include the number of the at least one alive object and/or a distance to each alive object.

According to an embodiment of the disclosure, the at least one processor may be configured to extract a vital sign related to the at least one alive object by analyzing the radar response information, and identify the presence of the at least one alive object based on the extracted vital sign.

According to an embodiment of the disclosure, the at least one processor may be configured to apply a scene optimization parameter related to at least one of color correction, context-based scene understanding, or adaptive compression to the camera module, based on detecting the presence or absence of the at least one alive object.

According to an embodiment of the disclosure, the at least one processor may be configured to calculate a distance to the at least one alive object based on the radar response information, and control the camera module to focus on the at least one alive object at the calculated distance.

According to an embodiment of the disclosure, the at least one processor may be configured to detect the at least one alive object in a low-light condition based on the radar response information, and control the camera module to focus on the at least one alive object.

According to an embodiment of the disclosure, the at least one processor may be configured to determine that face recognition in the first image is failed, upon detection of the absence of at least one alive object based on the radar response information.

According to an embodiment of the disclosure, a method of operating an electronic device may include receiving (operation 1105) radar response information related to a radar reflection signal through a UWB communication circuit. The method may include analyzing (operation 1110) the radar response information to identify the presence of at least one alive object in a first image captured by a camera module. The method may include adjusting (operation 1115) autofocusing of the camera module based on detecting the presence of the at least one alive object. The method may include displaying (operation 1120) a second image captured through the adjusted autofocusing by the camera module on a display module.

According to an embodiment of the disclosure, the method may further include controlling the UWB communication circuit to generate the radar response information based on a radar reflection signal obtained from a radar FOV overlapping with an optical FOV of the camera module.

According to an embodiment of the disclosure, adjusting may include controlling the camera module to focus on the at least one alive object detected through analysis of the radar response information.

According to an embodiment of the disclosure, the method may further include displaying, on the display module, scene description information related to the at least one alive object, together with the second image.

According to an embodiment of the disclosure, the scene description information may include the number of the at least one alive object and/or a distance to each alive object.

According to an embodiment of the disclosure, adjusting may include extracting a vital sign related to the at least one alive object by analyzing the radar response information, and identifying the presence of the at least one alive object based on the extracted vital sign.

According to an embodiment of the disclosure, adjusting may include applying a scene optimization parameter related to at least one of color correction, context-based scene understanding, or adaptive compression to the camera module, based on the presence or absence of the at least one alive object.

According to an embodiment of the disclosure, the method may further include calculating a distance to the at least one alive object based on the radar response information, and controlling the camera module to focus on the at least one alive object at the calculated distance.

According to an embodiment of the disclosure, the method may further include detecting the at least one alive object in a low-light condition based on the radar response information, and controlling the camera module to focus on the at least one alive object.

According to an embodiment of the disclosure, the method may further include determining that face recognition in the first image is failed, upon detection of the absence of at least one alive object based on the radar response information.

According to an embodiment of the disclosure, wherein the radar response information includes at least one of: a number of alive objects and distances to the alive objects; transmission and reception times of a raw radar signal and a radar reflection signal; information about a distance for autofocusing of the camera module; or information indicating a presence or absence of at least one object having a vital sign.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. An electronic device comprising:
a display;
a camera;
ultra-wideband (UWB) communication circuitry supporting UWB communication;
at least one processor including processing circuitry; and
memory comprising one or more storage media storing instructions which, when executed by the at least one processor individually or collectively, cause the electronic device to:
identify radar response information related to a radar reflection signal received through the UWB communication circuitry,
identify, based on the identified radar response information, a presence of at least one alive object in a first image captured by the camera,
adjust autofocusing of the camera based on the presence of the at least one alive object and a result of face recognition for the at least one alive object in the first image, and
display a second image captured through the adjusted autofocusing by the camera on the display.

2. The electronic device of claim 1, wherein the UWB communication circuitry is configured to generate the radar response information based on a radar reflection signal obtained from a radar field of view (FOV) overlapping with an optical FOV of the camera.

3. The electronic device of claim 1, wherein the instructions, when executed by the at least one processor individually or collectively, cause the electronic device to control the camera to focus on the at least one alive object detected through analysis of the radar response information.

4. The electronic device of claim 1, wherein the instructions, when executed by the at least one processor individually or collectively, cause the electronic device to display, on the display, scene description information related to the at least one alive object, together with the second image.

5. The electronic device of claim 4, wherein the scene description information includes a number of the at least one alive object and/or a distance to each alive object.

6. The electronic device of claim 1, wherein the instructions, when executed by the at least one processor individually or collectively, cause the electronic device to:
extract a vital sign related to the at least one alive object by analyzing the radar response information, and identify the presence of the at least one alive object based on the extracted vital sign.

7. The electronic device of claim 1, wherein the instructions, when executed by the at least one processor individually or collectively, cause the electronic device to apply a scene optimization parameter related to at least one of color correction, context-based scene understanding, or adaptive compression to the camera, based on the presence or absence of the at least one alive object.

8. The electronic device of claim 1, wherein the instructions, when executed by the at least one processor individually or collectively, cause the electronic device to:
calculate a distance to the at least one alive object based on the radar response information, and
control the camera to focus on the at least one alive object at the calculated distance.

9. The electronic device of claim 1, wherein the instructions, when executed by the at least one processor individually or collectively, cause the electronic device to:
detect the at least one alive object in a low-light condition based on the radar response information, and
control the camera to focus on the at least one alive object.

10. The electronic device of claim 1, wherein the instructions, when executed by the at least one processor individually or collectively, cause the electronic device to determine that face recognition in the first image is failed, upon detection of the absence of at least one alive object based on the radar response information.

11. A method of operating an electronic device, the method comprising:
identifying radar response information related to a radar reflection signal received through ultra-wideband (UWB) communication circuitry;
identifying, based on the identified radar response information, a presence of at least one alive object in a first image captured by a camera;
adjusting autofocusing of the camera based on the presence of the at least one alive object and a result of face recognition for the at least one alive object in the first image; and
displaying a second image captured through the adjusted autofocusing by the camera on a display.

12. The method of claim 11, further comprising:
controlling the UWB communication circuitry to generate the radar response information based on a radar reflection signal obtained from a radar field of view (FOV) overlapping with an optical FOV of the camera.

13. The method of claim 11, wherein adjusting comprises controlling the camera to focus on the at least one alive object detected through analysis of the radar response information.

14. The method of claim 11, further comprising:
displaying, on the display, scene description information related to the at least one alive object, together with the second image.

15. The method of claim 11, wherein adjusting comprises:
extracting a vital sign related to the at least one alive object by analyzing the radar response information; and
identifying the presence of the at least one alive object based on the extracted vital sign.

16. The method of claim 14, wherein the scene description information includes a number of the at least one alive object and/or a distance to each alive object.

17. The method of claim 11, wherein adjusting comprises applying a scene optimization parameter related to at least one of color correction, context-based scene understanding, or adaptive compression to the camera, based on the presence or absence of the at least one alive object.

18. The method of claim 11, further comprising:
calculating a distance to the at least one alive object based on the radar response information; and
controlling the camera to focus on the at least one alive object at the calculated distance.

19. The method of claim 11, further comprising:
detecting the at least one alive object in a low-light condition based on the radar response information; and
controlling the camera to focus on the at least one alive object.

20. The method of claim 11, further comprising:
determining that face recognition in the first image is failed, upon detection of the absence of at least one alive object based on the radar response information.

21. A non-transitory computer-readable storage medium for storing instructions which, when executed by at least one processor of an electronic device, cause the electronic device to perform:
identifying radar response information related to a radar reflection signal received through an ultra-wideband (UWB) communication circuitry;
identifying, based on the identified radar response information, a presence of at least one alive object in a first image captured by a camera;
adjusting autofocusing of the camera based on the presence of the at least one alive object and a result of face recognition for the at least one alive object in the first image; and
displaying a second image captured through the adjusted autofocusing by the camera on a display.

* * * * *